(12) United States Patent
Kim et al.

(10) Patent No.: US 9,905,320 B2
(45) Date of Patent: Feb. 27, 2018

(54) SEPARATE TYPE SAFETY INJECTION TANK AND INTEGRAL TYPE REACTOR HAVING THE SAME

(71) Applicant: KOREA ATOMIC ENERGY RESEARCH INSTITUTE, Daejeon (KR)

(72) Inventors: Young In Kim, Daejeon (KR); Young Min Bae, Daejeon (KR); Ju Hyeon Yoon, Daejeon (KR); Keung Koo Kim, Daejeon (KR)

(73) Assignee: KOREA ATOMIC ENERGY RESEARCH INSTITUTE, Daejeon (KR)

( * ) Notice: Subject to any disclaimer, the term of this patent is extended or adjusted under 35 U.S.C. 154(b) by 1077 days.

(21) Appl. No.: 13/958,487

(22) Filed: Aug. 2, 2013

(65) Prior Publication Data
US 2014/0050292 A1  Feb. 20, 2014

(30) Foreign Application Priority Data
Aug. 16, 2012  (KR) .......................... 10-2012-0089643

(51) Int. Cl.
 *G21C 15/18*  (2006.01)
 *G21C 1/32*  (2006.01)
(52) U.S. Cl.
 CPC .............. *G21C 15/18* (2013.01); *G21C 1/32* (2013.01); *Y02E 30/40* (2013.01)
(58) Field of Classification Search
 USPC ........................................................ 376/282
 See application file for complete search history.

(56) References Cited

U.S. PATENT DOCUMENTS 3,290,222 A * 12/1966 Schoessow ............ G21C 1/322
 376/281
3,346,459 A * 10/1967 Prince ...................... G21C 1/20
 376/224
(Continued)

FOREIGN PATENT DOCUMENTS

KR 20090040789 4/2009
KR 20120038638 4/2012

OTHER PUBLICATIONS

Notice of Allowance in Korean Patent Application No. 10-2012-0089643, dated Apr. 15, 2014, 2 pages.
(Continued)

*Primary Examiner* — Sean P Burke
(74) *Attorney, Agent, or Firm* — Morrison & Foerster LLP

(57) ABSTRACT

A separate type safety injection tank comprises: a coolant injection unit connected to a reactor coolant system by a safety injection pipe such that coolant stored therein is injected into the reactor coolant system by a pressure difference from the reactor coolant system when a loss-of-coolant-accident (LOCA) occurs; a gas injection unit connected to the coolant injection unit, and configured to pressurize the coolant injected into the reactor coolant system, by introducing gas stored therein to an upper part of the coolant injection unit in the loss-of-coolant-accident; and a choking device disposed between the coolant injection unit and the gas injection unit, and configured to contract a flow cross-sectional area of the gas introduced to the coolant injection unit, and configured to maintain a flow velocity and a flow rate of the gas introduced to the coolant injection unit as a critical flow velocity and a critical flow rate when a pressure difference between the coolant injection unit and the gas injection unit is more than a critical value.

14 Claims, 8 Drawing Sheets

(56) References Cited

U.S. PATENT DOCUMENTS

| | | | | |
|---|---|---|---|---|
| 3,819,476 A | * | 6/1974 | Pocock | G21C 9/012 |
| | | | | 376/282 |
| 3,859,166 A | * | 1/1975 | Flynn | G21C 15/18 |
| | | | | 376/282 |
| 3,981,770 A | * | 9/1976 | Middleton | G21C 15/18 |
| | | | | 137/888 |
| 4,032,401 A | * | 6/1977 | Froelich | G21C 7/06 |
| | | | | 376/219 |
| 4,046,626 A | * | 9/1977 | Winkler | G21C 15/18 |
| | | | | 376/282 |
| 4,753,771 A | * | 6/1988 | Conway | G21C 15/18 |
| | | | | 376/282 |
| 5,519,743 A | | 5/1996 | van de Venne et al. | |

OTHER PUBLICATIONS

Office Action issued in Korean Patent Application No. 10-2012-0089643, dated Oct. 14, 2013, 4 pages.

Kim et al., "Study of the critical gas flow through an orifice," Memoirs of the Korean Society of Mechanical Engineers, Nov. 30, 2003, pp. 532-537.

* cited by examiner

SEPARATE TYPE SAFETY INJECTION TANK AND INTEGRAL TYPE REACTOR HAVING THE SAME

CROSS-REFERENCE TO RELATED APPLICATION

Pursuant to 35 U.S.C. § 119(a), this application claims the benefit of earlier filing date and right of priority to Korean Application No. 10-2012-0089643, filed on Aug. 16, 2012, the contents of which is incorporated by reference herein in its entirety.

BACKGROUND OF THE INVENTION

1. Field of the Invention

The present invention relates to a safety injection system capable of injecting coolant to a reactor coolant system when a loss-of-coolant-accident (LOCA) occurs on an integral type reactor.

2. Background of the Invention

An integral type reactor has a characteristic that large pipes connected with main components such as a core, steam generators, a pressurizer, and pumps are not required, because the main components are installed in a reactor vessel. Pipes configured to connect a chemical and volume control system, a safety injection system, a shutdown cooling system, a safety valve, etc. with the reactor vessel of the integral type reactor are small. As the main components are accommodated in the integral type reactor, a great amount of coolant for a reactor coolant system is provided at an inner space of the reactor coolant system.

In the occurrence of a loss-of-coolant-accident (LOCA), this is a small break-loss-of-coolant-accidents (SBLOCA) due to a pipe rupture, etc., the integral type reactor shows progress states different from those of a separate type reactor. In case of the separate type reactor provided with large pipes, coolant is drastically lost when the large pipes are ruptured. Further, as the coolant is discharged, the reactor is drastically depressurized for a rapid pressure equilibrium state between the reactor and a reactor building (or containment). As a result, safety injection by a gravitational head of water is facilitated, and the coolant is rapidly refilled into the reactor by a safety injection system. Unlike such separate type reactor requiring a rapid injection, the integral type reactor has a characteristic that pressure and level thereof are gradually lowered when a loss-of-coolant-accident occurs, because large pipes are eliminated. As a result, a pressure equilibrium state between the reactor and a reactor building cannot be rapidly implemented, and there is a difficulty in performing safety injection by a gravitational head of water.

In order to solve such problems, the integral type reactor has been configured to adopt a safety injection tank using pressurized gas (generally, nitrogen) to inject coolant, or configured to comprise a specified passive safety injection system using a high pressure small containment. The passive safety injection system is configured to restrict the amount of coolant to be discharged by rapidly making a pressure equilibrium state between the reactor and a safeguard vessel, using a high pressure small containment such as a safeguard vessel, rather than a reactor building. The passive safety injection system uses a gravitational head of water, or a gas pressure, etc.

A safety injection tank, one of the passive safety injection system, especially, an integral type safety injection tank configured to inject coolant using pressurized gas and having coolant and gas stored in a single tank, is very sensitive to a pressure change inside a reactor coolant system in the occurrence of a LOCA.

In the occurrence of a large-break-loss-of-coolant-accident (LBLOCA), the reactor is drastically depressurized, safety injection is performed within a short time as coolant is rapidly injected. On the other hand, in the occurrence of a small LOCA, the reactor is gradually depressurized to cause safety injection not to be performed when required.

In the safety injection tank configured to pressurize coolant using gas, if a reference pressure is set to be lower than a reactor pressure predicted in a large-break-loss-of-coolant-accident, coolant may not be safely injected into the reactor when a small-break-loss-of-coolant-accident occurs, because the reactor is little depressurized. On the other hand, if the reference pressure is set to be higher than the reactor pressure predicted in a small-break-loss-of-coolant-accident, a safety injection operation may be early terminated when a large-break-loss-of-coolant-accident occurs, because the reactor is rapidly depressurized.

Accordingly, may be considered a safety injection system capable of injecting a comparatively constant amount of coolant regardless of a scale of a pipe rupture.

SUMMARY OF THE INVENTION

Therefore, an aspect of the detailed description is to provide a separate type safety injection tank having a differentiated structure from the conventional art.

Another aspect of the detailed description is to provide a separate type safety injection tank capable of performing a safety injection operation for a long time in a loss-of-coolant-accident (LOCA), by a required design characteristic of an integral type reactor.

Still another aspect of the detailed description is to provide a separate type safety injection tank capable of coping with pipe rupture accidents of various scales.

To achieve these and other advantages and in accordance with the purpose of this specification, as embodied and broadly described herein, there is provided a separate type safety injection tank, comprising: a coolant injection unit connected to a reactor coolant system by a safety injection pipe such that coolant stored therein is injected into the reactor coolant system by a pressure difference when a loss-of-coolant-accident (LOCA) occurs; a gas injection unit connected to the coolant injection unit, and configured to pressurize the coolant injected into the reactor coolant system, by introducing gas stored therein to an upper part of the coolant injection unit when the loss-of-coolant-accident occurs; and a choking device disposed between the coolant injection unit and the gas injection unit, and configured to contract a flow cross-sectional area of the gas introduced to the coolant injection unit, and configured to maintain a flow velocity and a flow rate of the gas introduced to the coolant injection unit as a critical flow velocity and a critical flow rate when a pressure difference between the coolant injection unit and the gas injection unit is more than a critical value.

According to an embodiment, the coolant injection unit may be provided with a coolant tank for storing the coolant therein, and the gas injection unit may be provided with a gas tank for storing the gas therein. The coolant tank and the gas tank may be connected to each other by a connection pipe, and the choking device may be installed at the connection pipe.

According to another embodiment, the safety injection unit and the gas injection unit may be implemented as a single safety injection tank, and the safety injection tank may be provided with a partition wall for partitioning the coolant injection unit and the gas injection unit from each other. The orifice may be installed at the partition wall.

According to another embodiment, the separate type safety injection tank may further comprise a throttle member installed at the safety injection pipe such that a flow rate of the coolant injected into the reactor coolant system is restricted, and configured to contract a flow cross-sectional area of the safety injection pipe.

According to another embodiment, the separate type safety injection tank may further comprise a check valve installed at the safety injection pipe such that the coolant inside the reactor coolant system is prevented from back-flowing and leaking into the separate type safety injection tank.

At least part of the choking device may protrude from an inner side wall of the pipe line formed by the connection pipe or the partition wall.

To achieve these and other advantages and in accordance with the purpose of this specification, as embodied and broadly described herein, there is also provided an integral type reactor comprising: a core makeup tank configured to inject coolant into a reactor coolant system using a gravity force and pressure balance when an accident occurs on the reactor, by reaching a pressure equilibrium state with the reactor coolant system; and a separate type safety injection tank connected to the reactor coolant system, and configured to inject coolant stored therein into the reactor coolant system when a loss-of-coolant-accident (LOCA) occurs, wherein the separate type safety injection tank comprises: a coolant injection unit connected to a reactor coolant system by a safety injection pipe such that coolant stored therein is injected into the reactor coolant system by a pressure difference when the loss-of-coolant-accident occurs; a gas injection unit connected to the coolant injection unit, and configured to pressurize the coolant injected into the reactor coolant system, by introducing gas stored therein to an upper part of the coolant injection unit in the loss-of-coolant-accident; and a choking device disposed between the coolant injection unit and the gas injection unit, and configured to contract a flow cross-sectional area of the gas introduced to the coolant injection unit, and configured to maintain a flow velocity and a flow rate of the gas introduced to the coolant injection unit as a critical flow velocity and a critical flow rate when a pressure difference between the coolant injection unit and the gas injection unit is more than a critical value.

According to an embodiment, the coolant injection unit may be provided with a coolant tank for storing the coolant therein, and the gas injection unit may be provided with a gas tank for storing the gas therein. The coolant tank and the gas tank may be connected to each other by a connection pipe, and the choking device may be installed at the connection pipe.

According to another embodiment, the safety injection unit and the gas injection unit may be implemented as a single safety injection tank, and the safety injection tank may be provided with a partition wall for partitioning the coolant injection unit and the gas injection unit from each other. The choking device may be installed at the partition wall.

According to another embodiment, the integral type reactor may further comprise a throttle member installed at the safety injection pipe such that a flow rate of the coolant injected into the reactor coolant system is restricted, and configured to contract a flow cross-sectional area of the safety injection pipe.

According to another embodiment, the integral type reactor may further comprise a check valve installed at the safety injection pipe such that the coolant inside the reactor coolant system is prevented from back-flowing and leaking into the separate type safety injection tank.

At least part of the choking device may protrude from an inner side wall of the pipe line formed by the connection pipe or the partition wall.

According to another embodiment, the integral type reactor may further comprise an isolation valve installed at a pipe which connects a lower end of the core makeup tank with the reactor coolant system, and configured to be open by an actuation signal generated when a related accident occurs, such that the coolant is injected into the reactor coolant system from the core makeup tank when an accident occurs on the reactor.

According to another embodiment, the integral type reactor may further comprise a pressure balancing pipe having one end connected to the reactor coolant system and another end connected to the core makeup tank, such that a pressure balance (back pressure) with the reactor coolant system is formed at the core makeup tank.

According to another embodiment, the integral type reactor may further comprise a passive residual heat removal system configured to remove heat of the core by circulating a fluid stored therein to a steam generator inside the reactor coolant system, when an accident occurs on the reactor.

According to another embodiment, the integral type reactor may further comprise an isolation valve installed at a pipe which connects the passive residual heat removal system with the reactor coolant system, and configured to be open by an actuation signal generated when a related accident occurs.

The present application can be applied to a general reactor, not only an integral type reactor.

Further scope of applicability of the present application will become more apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from the detailed description.

BRIEF DESCRIPTION OF THE DRAWINGS

The accompanying drawings, which are included to provide a further understanding of the invention and are incorporated in and constitute a part of this specification, illustrate exemplary embodiments and together with the description serve to explain the principles of the invention. In the drawings.

DETAILED DESCRIPTION OF THE INVENTION

Description will now be given in detail of the exemplary embodiments, with reference to the accompanying drawings. For the sake of brief description with reference to the drawings, the same or equivalent components will be provided with the same reference numbers, and description thereof will not be repeated. As used herein, the singular forms are intended to include the plural forms as well, unless the context clearly indicates otherwise.

Hereinafter, a separate type safety injection tank according to the present invention will be explained in more detail with reference to the attached drawings. The suffixes attached to components of the separate type safety injection tank, such as 'unit' and 'system' were used for facilitation of the detailed description of the present invention. Therefore, the suffixes do not have different meanings from each other.

The passive safety injection systems (core makeup tanks and safety injection tanks) and the passive residual heat removal systems according to the invention may be provided as plural. Unless indicated otherwise, the passive safety injection system and the passive residual heat removal system may not exclude the meaning of plural.

Figure 1:
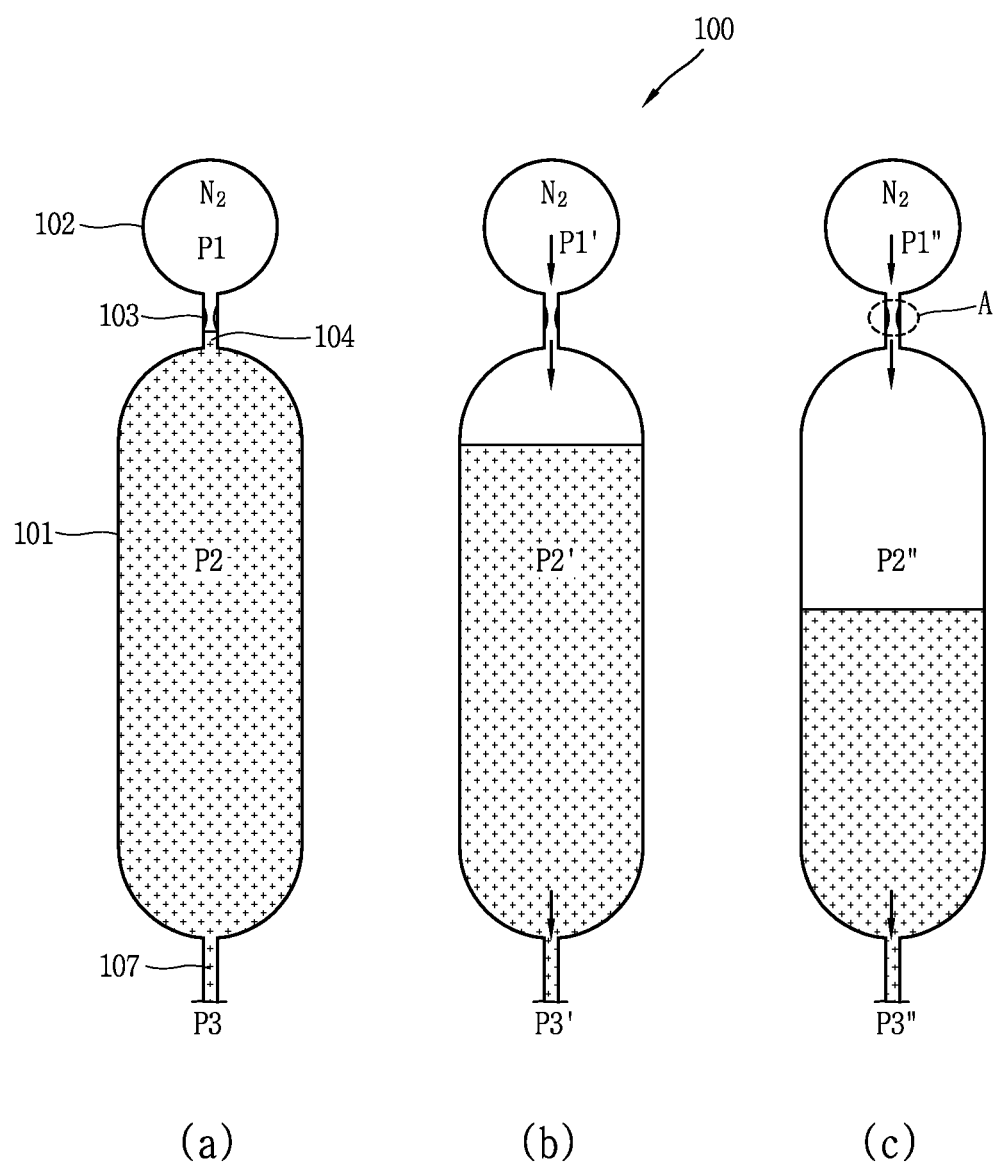
FIG. 1 is a conceptual view showing an operation of a separate type safety injection tank according to an embodiment of the present invention.

FIG. 1 is a conceptual view showing an operation of a separate type safety injection tank 100 according to an embodiment of the present invention.

A passive safety injection system indicates a system capable of injecting coolant into a reactor coolant system using a natural force such as gravity, a natural circulation and a pressure difference (pressurized gas), when a loss-of-coolant-accident (LOCA) occurs in a reactor coolant system. A device of the passive safety injection system, a safety injection tank is an apparatus for injecting coolant stored therein into a reactor coolant system, using a pressurized gas.

Referring to FIG. 1, the separate type safety injection tank comprises a coolant injection unit 101, a gas injection unit 102 and an orifice 103.

The coolant injection unit 101 is filled with coolant (e.g., a boric acid solution of low temperature), and a lower part thereof is connected to a safety injection pipe 107 communicated with a reactor coolant system. In the occurrence of a LOCA in a reactor coolant system due to a pipe rupture, etc., the reactor coolant system starts to be depressurized. Due to a pressure difference between the reactor coolant system and the coolant injection unit 101, the coolant stored in the coolant injection unit 101 is injected into the reactor coolant system through the safety injection pipe 107.

The gas injection unit 102 is connected to the coolant injection unit 101, and is configured to pressurize coolant to be injected into the reactor coolant system, by introducing gas stored therein to an upper part of the coolant injection unit 101 in the occurrence of a LOCA. As the gas, nitrogen gas may be used.

The orifice 103 is provided between the coolant injection unit 101 and the gas injection unit 102, and is configured to reduce a flow cross-sectional area of gas injecting to the coolant injection unit 101 from the gas injection unit 102. The coolant injection unit 101 and the gas injection unit 102 may be connected to each other by a connection part 104, and the orifice 103 may be installed in the connection part 104. As shown, the connection part 104 may be a connection pipe installed to be communicated with the coolant injection unit 101 and the gas injection unit 102. The orifice 103 may be installed on an inner side wall of a pipe line of the connection part 104, or may be formed to contract the pipe line by partially protruding from the inner side wall.

A pressure difference between the gas injection unit 102 and the coolant injection unit 101 is less than a critical value, a flow rate of gas to be injected increases until the pressure difference reaches the critical value. A critical pressure occurs when a compressible fluid flows, which indicates a downstream pressure in a state where a flow velocity is the same as the speed of sound while the downstream pressure gradually decreases. A critical pressure difference indicates a pressure difference between the upstream side and the downstream side when the fluid reaches the critical pressure. The downstream pressure may be lowered to the critical pressure or a value less than, so that the pressure difference between the downstream side and the upstream side may be the critical pressure difference or more than. In this case, even if the downstream pressure is lowered, the flow velocity and the flow rate are maintained as a critical fluid velocity and a critical flow rate without an increment. Such flow in a state where the downstream pressure is lower than the critical pressure, i.e., in a state where the pressure difference is more than the critical pressure difference, is called 'choked flow' or 'critical flow'.

If a pressure difference between the gas injection unit 102 and the coolant injection unit 101 reaches a critical value, the orifice 103 makes gas passing therethrough have a critical flow velocity and a critical flow rate. If a pressure difference between the gas injection unit 102 and the coolant injection unit 101 reaches a critical value, the orifice 103 chokes the gas passing therethrough so that the gas can maintain a critical flow velocity and a critical flow rate. As the gas passing through the orifice 103 maintains a critical flow velocity and a critical flow rate by the orifice 103, the coolant inside the coolant injection unit 101 may be slowly and continuously injected into the reactor coolant system in spite of a drastic pressure change of the reactor coolant system.

FIG. 1(a) illustrates a state shortly before a safety injection operation starts as pressure (P3) of the reactor coolant system decreases to a value less than a preset pressure (P1) of the gas injection unit 102 after a loss-of-coolant-accident (LOCA) occurring in the reactor coolant system due to a pipe rupture, etc. If the pressure (P3) of the reactor coolant system decreases to a value less than the preset pressure (P1) of the gas injection unit 102 due to a LOCA occurring at the reactor coolant system, valves such as check valves installed at the safety injection pipe 107 is open, and the coolant stored in the coolant injection unit 101 starts to be injected into the reactor coolant system through the safety injection pipe 107. Once the coolant starts to be injected into the reactor coolant system from the coolant injection unit 101, the level of the coolant injection unit 101 is lowered and pressure (P2) of the gas injection unit 102 is reduced. As a result, there also occurs a pressure difference (P1–P2) between the gas injection unit 102 and the coolant injection unit 101. By such pressure difference (P1–P2), the gas stored in the gas injection unit 102 is introduced into the coolant injection unit 101 via the orifice 103.

FIG. 1(b) illustrates a state that a pressure difference (P1'–P2') between the gas injection unit 102 and the coolant injection unit 101 is greater than that of FIG. 1(a), which results from that the reactor coolant system is more depressurized. In a case where the pressure difference (P1'–P2') is less than a critical value, a flow rate of gas to be injected into the coolant injection unit 101 from the gas injection unit 102 increases as a differential pressure increases. If the pressure difference (P1'–P2') reaches a critical pressure difference, gas passing through the orifice 103 has a critical flow velocity and a critical flow rate.

FIG. 1(c) illustrates a state that a pressure difference (P1"–P2") between the gas injection unit 102 and the coolant injection unit 101 is greater than a critical value. The orifice 103 makes the gas introduced to the coolant injection unit 101 from the gas injection unit 102 maintain a critical flow velocity and a critical flow rate. Accordingly, the orifice 103 prevents the pressure inside the coolant injection unit 101 from increasing. A flow rate of coolant injected into the reactor coolant system is determined by a pressure difference (P2"–P3") between the coolant injection unit 101 and the reactor coolant system. Accordingly, the separate type safety injection tank 100 having the orifice 103 can maintain a small flow rate of coolant to be injected, than an integral type safety injection tank where gas and coolant are not separated and stored in a single tank. This can prevent coolant from being injected into the reactor coolant system within a short time, but allow coolant to be continuously injected into the reactor coolant system for a desired time duration.

A flow rate of coolant, which is injected into the reactor coolant system from the separate type safety injection tank 100, is comparatively constant without being much influenced by a pressure change of the reactor coolant system, due to a characteristic of a critical flow velocity. Accordingly, the separate type safety injection tank 100 may be applicable to various sizes of LOCAs such as a small, a middle, and a relatively large pipe rupture, etc. It is the coolant injection unit 101 of the safety injection tank 100 that is directly influenced by a pressure change inside the reactor coolant system. Therefore, in early and middle stages of a LOCA, a flow rate of gas introduced into the coolant injection unit 101 is significantly smaller than that in an integral type safety injection tank. This may cause the coolant injection unit 101 to be significantly depressurized if the coolant of the coolant injection unit 101 is injected into the reactor coolant system, because the volume of gas in the coolant injection unit 101 is very small. Consequently, the separate type safety injection tank 100 can prevent coolant from being rapidly injected into the reactor coolant system, without being sensitive to a pressure change inside the reactor coolant system.

The separate type safety injection tank 100 is configured to inject coolant into the reactor coolant system using a pressurized gas and to prolong the injection period using a choked flow, thereby injecting coolant for a long time in a passive manner using a natural force. Therefore, the separate type safety injection tank 100 can enhance the safety of an integral type reactor.

Figure 2:
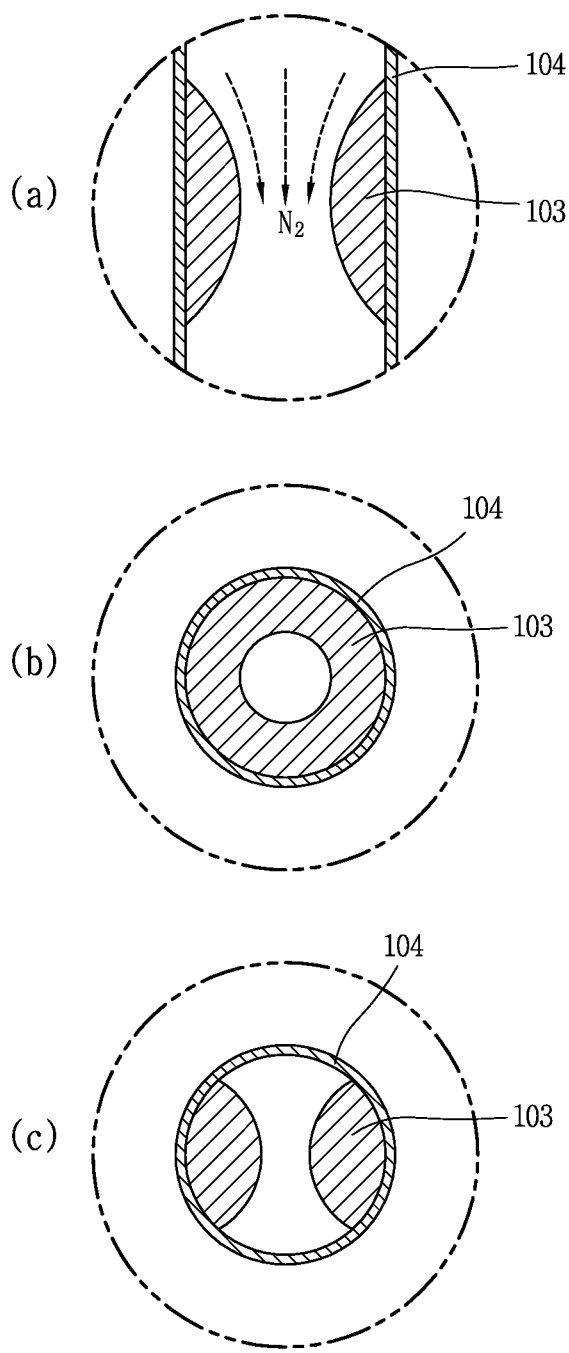
FIG. 2 is an enlarged sectional view of part 'A' of FIG. 1.

FIG. 2 is an enlarged sectional view of part 'A' of FIG. 1.

Referring to FIG. 2(a), the orifice 103 protrudes from an inner side wall of the connection part 104 partially or wholly, thereby contracting the pipe line of the connection part 104. The orifice 103 contracts a flow cross-sectional area of gas passing through the connection part 104, thereby restricting a movement of the gas. The gas has a large flow cross-sectional area before reaching the orifice 103. However, the flow cross-sectional area is contracted as the pipe line is contracted. As shown in FIG. 1, a critical flow is formed at the orifice 103 when a pressure difference between the coolant injection unit 101 and the gas injection unit 102 is more than a critical value. The critical flow-occurred part has a smallest flow cross-sectional area, thereby reaching a small critical flow rate.

Referring to FIG. 2(b), a sectional surface of the orifice (or a venturi) 103 may have a circular shape formed along an inner circumferential surface of the connection part 104. However, the shape of the orifice 103 is not limited to this. The orifice 103 may be formed only on part of an inner side wall of the connection part 104 as shown in FIG. 2(c). A movement of gas inside the pipe line may be variable according to a shape of the orifice 103. However, the fact that a critical flow always occurs when a pressure difference between the coolant injection unit 101 and the gas injection unit 102 is more than a critical value, is not changeable.

Figure 3:
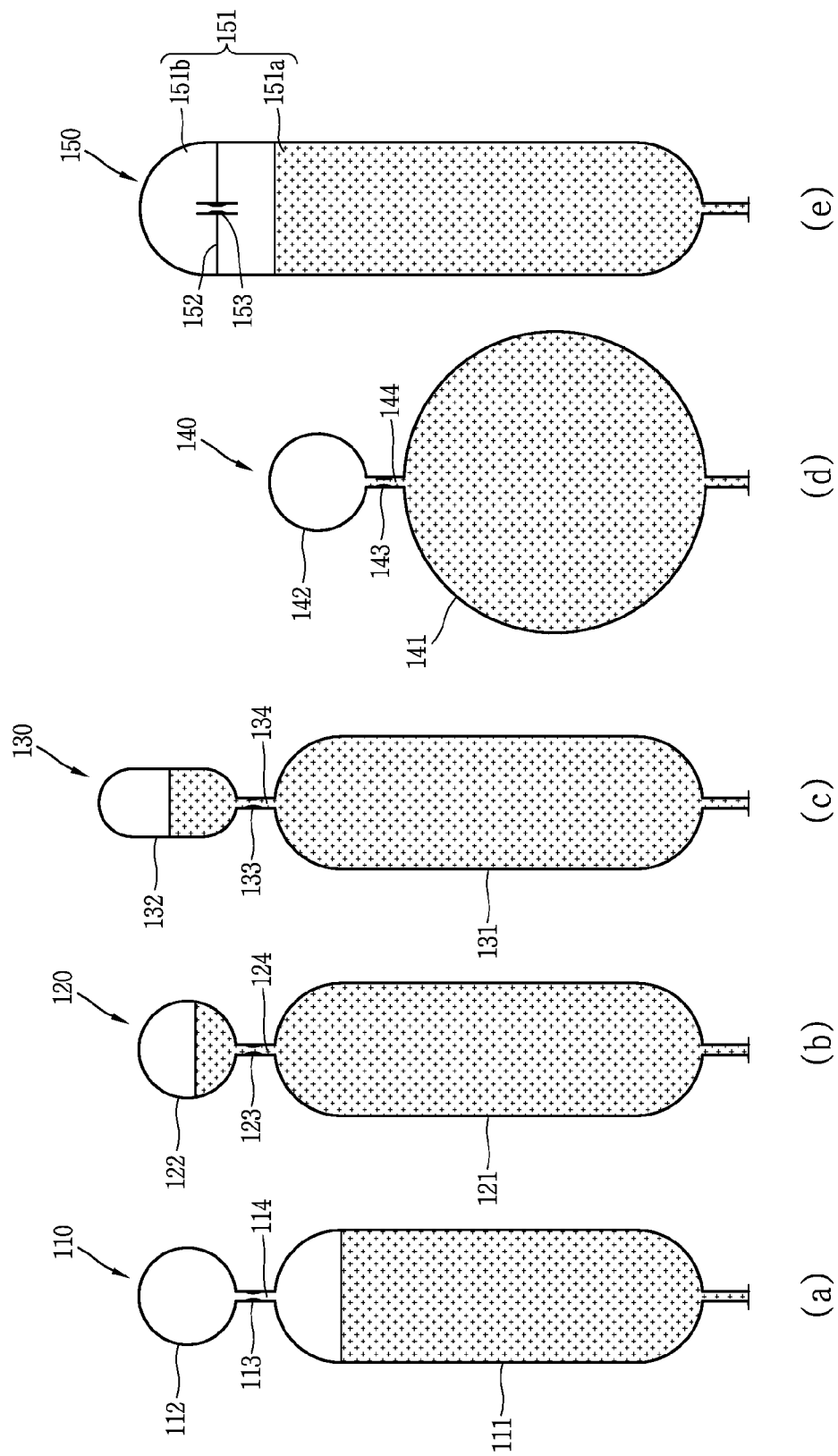
FIG. 3 is a conceptual view of a separate type safety injection tank according to various modification embodiments of the present invention.

FIG. 3 is a conceptual view of separate type safety injection tanks 110, 120, 130, 140 and 150 according to various modification embodiments of the present invention.

As shown, the separate type safety injection tanks 110, 120, 130, 140 and 150 may be in different shapes, and may have various levels of coolant stored in coolant injection units 111, 121, 131, 141 and 151a. According to a level of coolant, a safety injection type for the coolant to be injected into the reactor coolant system may be determined.

In the separate type safety injection tanks 110, 120, 130 and 140 of FIGS. 3(a) to 3(d), the coolant injection units 111, 121, 131 and 141 are provided with tanks separated from tanks of gas injection units 112, 122, 132 and 142. More specifically, the coolant injection units 111, 121, 131 and 141 are provided with coolant tanks 111, 121, 131 and 141 for storing coolant therein, and the gas injection units 112, 122, 132 and 142 are provided with gas tanks 112, 122, 132 and 142 for storing gas therein. The coolant tanks 111, 121, 131 and 141, and the gas tanks 112, 122, 132 and 142 are connected to each other by connection pipes 114, 124, 134 and 144. Orifices 113, 123, 133 and 143 are installed at the connection pipes 114, 124, 134 and 144.

On the other hand, in the separate type safety injection tank 150 of FIG. 3(e), the coolant injection unit 151a and a gas injection unit 151b are implemented as a single safety injection tank 151. The safety injection tank 151 is provided with a partition wall 152 for partitioning the coolant injection unit 151a and the gas injection unit 151b from each other. The orifice 153 is installed at the partition wall 152 so that gas introduced from the gas injection unit 151b can pass through the orifice 153. Once the orifice 153 is installed between the coolant injection unit 151a and the gas injection unit 151b as shown in FIG. 3(e), a critical flow of gas can be formed. Therefore, the separate type safety injection tank 150 is not necessarily required to have a connection pipe where the orifice 153 is installed between the coolant injection unit 151a and the gas injection unit 151b.

FIGS. 3(a) and 3(b) illustrate separate type safety injection tanks 110 and 120 having the same shape as the separate type safety injection tank 100 of FIG. 1, but having different safety injection characteristics according to a level of coolant.

Referring to FIG. 3(a), the coolant tank 111 of the separate type safety injection tank 110 is partially filled with gas.

Therefore, in an early stage of a pipe rupture accident, the gas filled in the coolant tank 111 is expanded so that a large amount of coolant is injected into the reactor coolant system. Then, a critical flow occurs between the gas tank 112 and the coolant tank 111, so that the coolant is gradually injected into the reactor coolant system in middle and later stages of a LOCA.

Referring to FIG. 3(b), the coolant tank 121 is filled with coolant, and the coolant is stored up to part of the gas tank 122 of the separate type safety injection tank 120. Therefore, in an early stage of a pipe rupture accident, the coolant is injected into the reactor coolant system by the amount stored in the gas tank 122. After the coolant stored in the gas tank 122 is completely injected into the reactor coolant system, gas stored in the gas tank 122 forms a critical flow by the orifice 123, and the residual coolant is gradually injected into the reactor coolant system in middle and later stages of a LOCA.

Referring to FIG. 3(c), the separate type safety injection tank 130 has the gas tank 132 of a shape transformed from the gas tanks 112 and 122 of the separate type safety injection tanks 110 and 120 shown in FIGS. 3(a) and 3(b). The gas tank 132 may be designed to have a shape to overcome a spatial restriction and to reduce waste of an unnecessary space, by a required design characteristic of an integral type reactor. The separate type safety injection tank 130 of FIG. 3(c) has a similar level of coolant to the separate type safety injection tank 120 of FIG. 3(b), and thus has the same safety injection process as the separate type safety injection tank 120 of FIG. 3(b).

Referring to FIG. 3(d), the separate type safety injection tank 140 has the coolant tank 141 of a shape transformed from the coolant tanks 111 and 121 of the separate type safety injection tanks 110 and 120 shown in FIGS. 3(a) and 3(b). Like the gas tank 142, the coolant tank 141 may be designed to have a shape to overcome a spatial restriction and to reduce waste of an unnecessary space, by a required design characteristic of an integral type reactor. However, the separate type safety injection tank 140 has a different level of coolant from the separate type safety injection tanks 110, 120 and 130 of FIGS. 3(a), 3(b) and 3(c), and thus has a different safety injection operation therefrom. Rather, the separate type safety injection tank 140 has a similar safety injection operation to the separate type safety injection tank 100 of FIG. 1. In the separate type safety injection tank 140 of FIG. 3(d), coolant is gradually injected into the reactor coolant system by a critical flow of gas when a pipe rupture accident occurs, because there is no expansion of gas, and there is no coolant stored in the gas tank 142.

Referring to FIG. 3(e), the coolant injection unit 151a and the gas injection unit 151b of the separate type safety injection tank 150 are implemented as a single safety injection tank 151. However, the coolant injection unit 151a and the gas injection unit 151b are separated from each other by the partition wall 152. Since the coolant injection unit 151a is filled with gas before a pipe rupture accident occurs, a large amount of coolant is injected into the reactor coolant system due to expansion of the gas in an early stage of a pipe rupture accident, in the same manner as in FIG. 3(a). A safety injection operation in middle and later stages of a pipe rupture accident is also the same as the operation aforementioned in FIG. 3(a).

FIGS. 3(a) to 3(e) illustrate various modification embodiments of the present invention, in which a safety injection operation to inject coolant into a reactor coolant system is variable according to a shape of a separate type safety injection tank and a level of coolant. However, the present invention is not limited to this, but may be implemented through a combination of various types and levels of coolant according to a required characteristic of a reactor.

Hereinafter, an operation of an integral type reactor having the above separate type safety injection tank will be explained in more detail.

Figure 4:
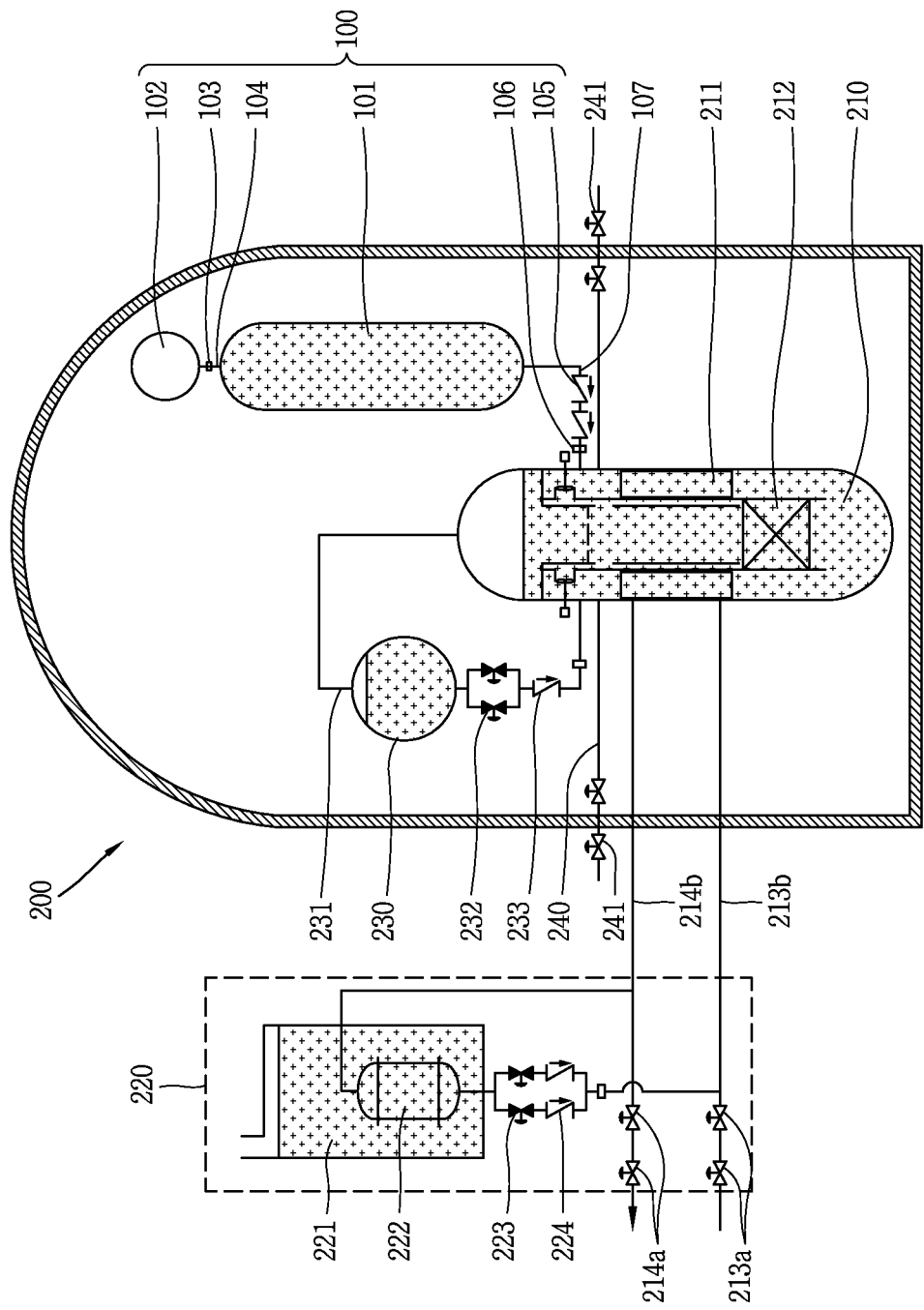
FIG. 4 is a conceptual view showing an arrangement of systems of an integral type reactor having a safety injection tank during a normal operation.

FIG. 4 is a conceptual view showing an arrangement of systems of an integral type reactor 200 having the separate type safety injection tank 100, during a normal operation, according to an embodiment of the present invention.

The integral type reactor 200 comprises a reactor coolant system 210, a passive residual heat removal system 220, a core makeup tank 230 and the separate type safety injection tank 100.

A large amount of coolant for the reactor coolant system is stored in the reactor coolant system 210. During a normal operation, a feed water valve 213a and a steam valve 214a are open, and feed water is supplied through a feed water pipe 213b to thus be converted into steam of a high temperature and a high pressure in a steam generator 211. Then, the converted steam is supplied to a turbine through the steam pipe 214b. Under such processes, electrical power is generated.

The separate type safety injection tank 100 may be operated in a condition of a relatively high pressure. In a case where the integral type reactor 200 comprises the separate type safety injection tank 100 together with the passive residual heat removal system 220 for continuously removing heat of the reactor core, and the pressure balance type (back pressure type) core makeup tank 230 for injecting coolant into the reactor coolant system using a gravity force and a pressure balance with the reactor coolant system, there is required no electrical power system such as an emergency diesel generator for pump driving. Further, errors occurring from an operator action for operation of safety system can be reduced. This can significantly enhance reliability and stability of the integral type reactor 200.

FIGS. 5 to 8 illustrate, in time order, an operation of a related system when a LOCA occurs due to a pipe rupture, etc.

Figure 5:
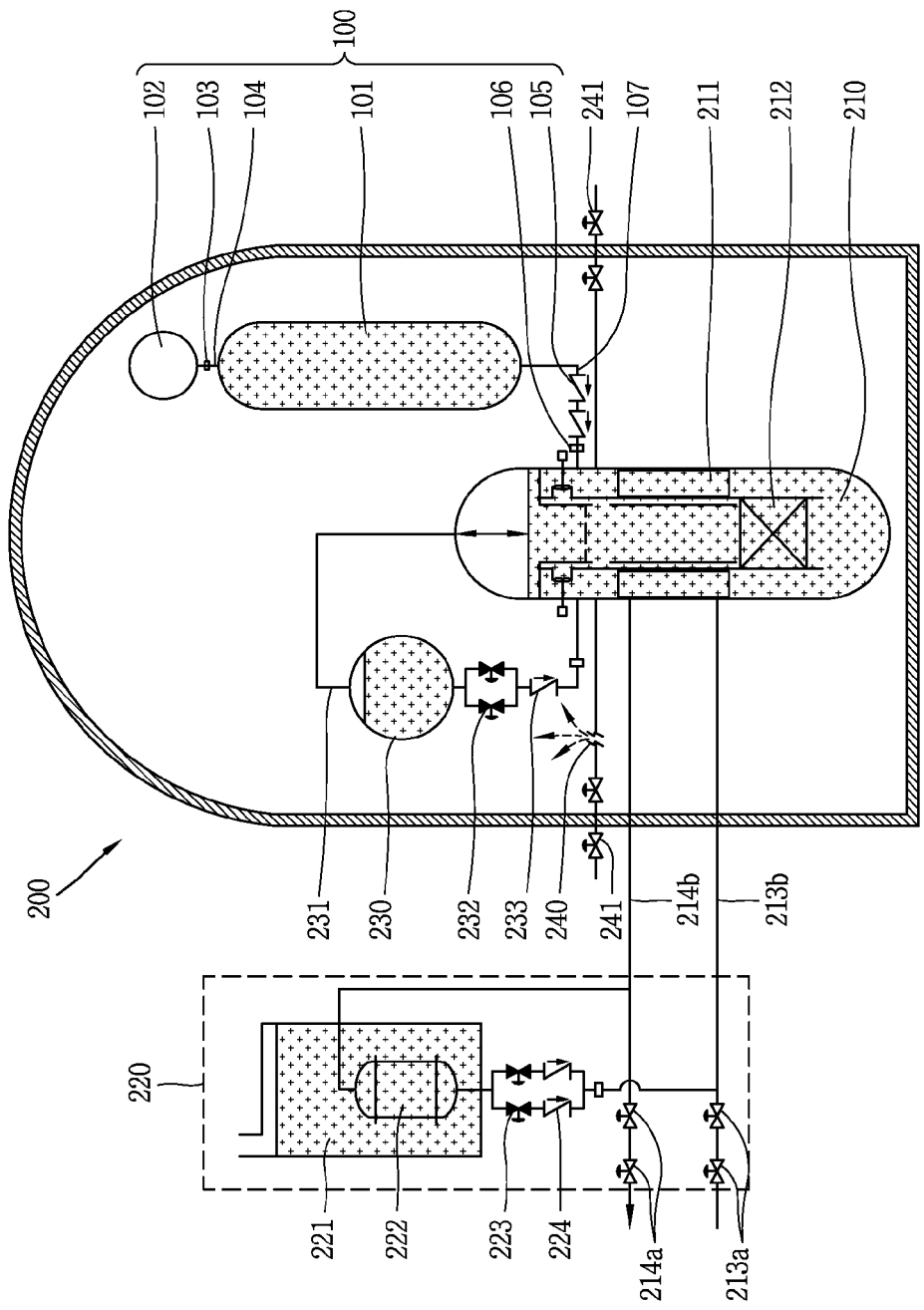
FIG. 5 is a conceptual view showing an early stage of a loss-of-coolant-accident (LOCA) occurring due to a pipe rupture of an integral type reactor, etc.

FIG. 5 is a conceptual view showing an early stage of a LOCA occurring on the integral type reactor 200 of FIG. 4, due to a pipe rupture, etc.

Referring to FIG. 5, coolant of the reactor coolant system 210 starts to be lost to a ruptured part 240 when a pipe connected to the reactor coolant system 210 ruptures. As a result, the reactor coolant system 210 has a lowered level and is depressurized.

Figure 6:
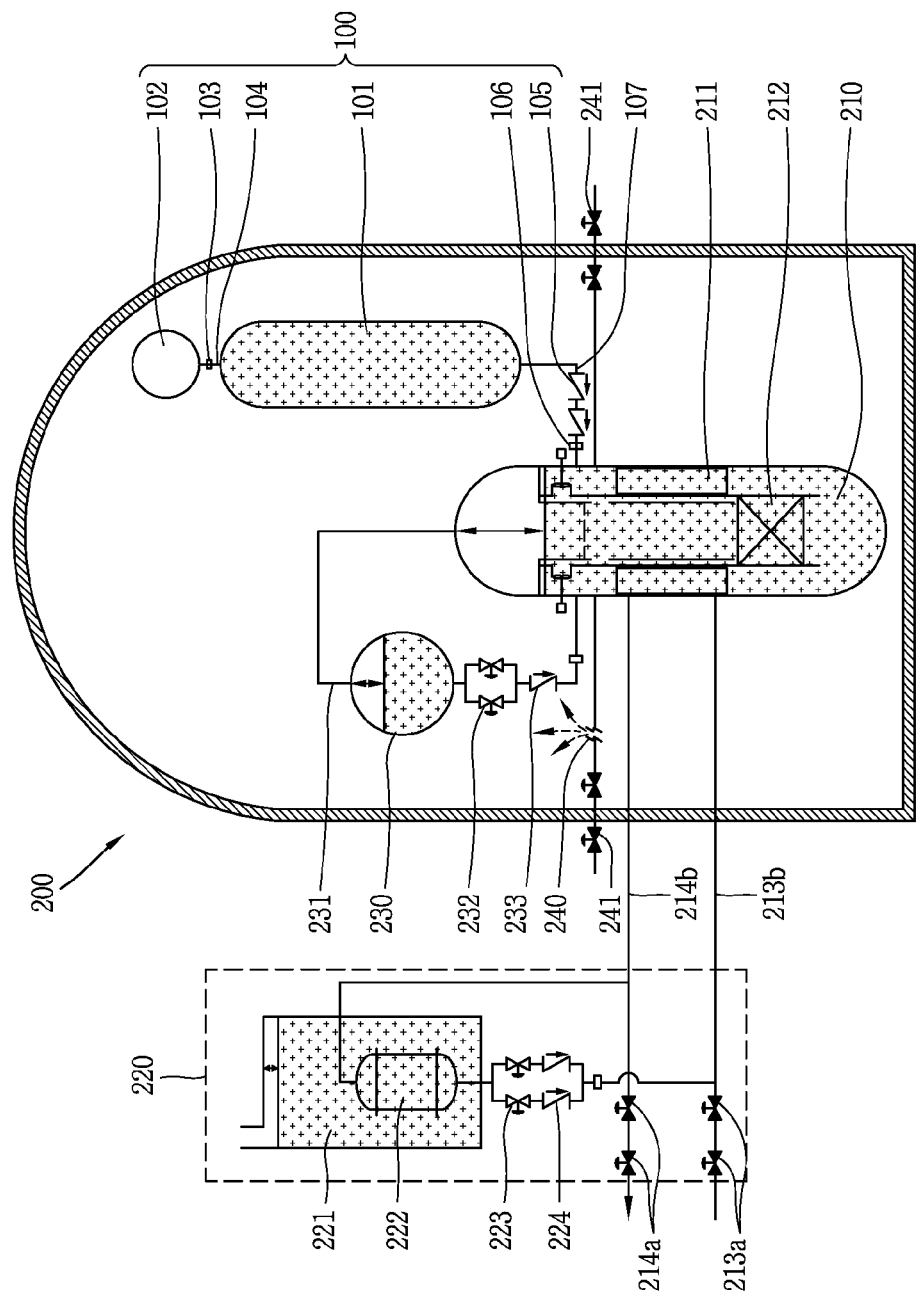
FIG. 6 is a conceptual view subsequent to FIG. 5, which shows operational states of a passive residual heat removal system and a core makeup tank.

FIG. 6 is a conceptual view subsequent to FIG. 5, which shows operational states of the passive residual heat removal system 220 and the core makeup tank 230.

The passive residual heat removal system 220 is a system to remove sensible heat of a reactor coolant system and residual heat of a core 212. The feed water valve 213a, the steam valve 214a and containment isolation valves 241 are in a closed state when a containment isolation signal is generated as a related actuation signal initiating from high containment pressure, etc. Once the feed water valve 213a and the steam valve 214a in an open state are closed, an isolation valve 223 and a check valve 224 of the passive residual heat removal system 220 are open. At the same time, a fluid stored in the passive residual heat removal system 220 circulates through the steam generator 211 and a heat exchanger 222, thereby transmitting heat of the core to an emergency cooling tank 221.

The core makeup tank 230 is a sort of safety injection system for injecting coolant to the reactor coolant system 210 in the occurrence of a loss-of-coolant-accident or non-loss-of-coolant-accident. The core makeup tank 230 performs a gravity driven and pressure balance type safety injection due to a level difference from the reactor coolant system 210. The core makeup tank 230 should be installed to have a proper height difference from the reactor coolant system 210, because it uses a gravitational head of water when injecting coolant into the reactor coolant system 210. If the reactor coolant system 210 is depressurized and has a lowered level, an operation signal is generated to open the isolation valves 232 and the check valve 233, and coolant is injected into the reactor coolant system 210 from the core makeup tank 230.

A pressure balancing pipe 231 has one end connected to the reactor coolant system 210, and another end connected to the core makeup tank 230. The pressure balancing pipe 231 is configured to form a pressure balance between the core makeup tank 230 and the reactor coolant system 210, so that coolant can be smoothly injected into the reactor coolant system 210 from the core makeup tank 230.

The core makeup tank 230 is provided with the pressure balancing pipe 231, thereby injecting coolant to the reactor coolant system 210 by a gravitational head of water using a pressure equilibrium state with the reactor coolant system 210. The core makeup tank 230 is not sensitive to a pressure change of the reactor coolant system 210, and has a limitation in an installation height to thus have a small design gravitational head of water. Due to such characteristics, it is not appropriate to apply the core makeup tank 230 to a situation requiring a rapid safety injection operation due to drastic depressurization of the reactor coolant system (e.g., a large break LOCA occurring on a separate type reactor), so it is a facility for non-loss-of-coolant-accident in a separate type reactor. Further, since the core makeup tank 230 should be installed at a position higher than the ruptured part of the reactor, it is difficult to apply the core makeup tank 230 to a small space.

Referring to FIG. 6, the level of the reactor coolant system 210 is gradually lowered and the reactor coolant system 210 is depressurized as time lapses. The core makeup tank 230 operates in a higher pressure condition than the separate type safety injection tank 100. Accordingly, the core makeup tank 230 has already started its operation before the reactor coolant system 210 is depressurized to a value lower than a preset pressure of the separate type safety injection tank 100. However, the separate type safety injection tank 100 has not yet started its operation, because the reactor coolant system 210 has not been depressurized to a value less than a preset pressure of the separate type safety injection tank 100.

Figure 7:
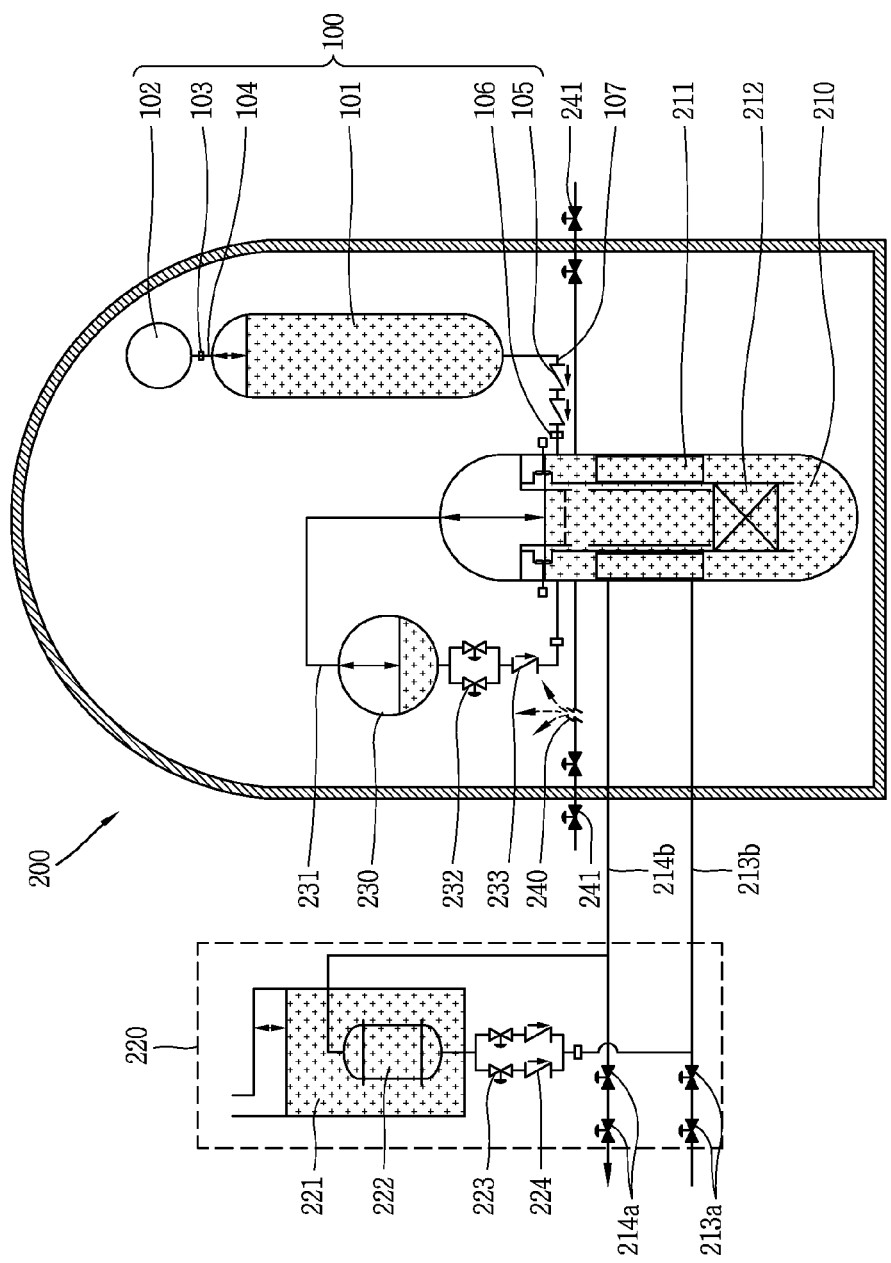
FIG. 7 is a conceptual view subsequent to FIG. 6, which shows operational states of a passive residual heat removal system, a core makeup tank and a separate type safety injection tank.

FIG. 7 is a conceptual view subsequent to FIG. 6, which shows operational states of the passive residual heat removal system 220, the core makeup tank 230 and the separate type safety injection tank 100.

Referring to FIG. 7, as time lapses after a LOCA, the level of the reactor coolant system 210 is more lowered, and the reactor coolant system 210 is more depressurized than in the case of FIG. 6. In FIG. 7, the reactor coolant system 210 is depressurized to a value less than a preset pressure of the separate type safety injection tank 100.

Like in FIG. 5, the passive residual heat removal system 220 and the core makeup tank 230 continuously operate, thereby removing heat of the reactor core and injecting coolant to the reactor coolant system 210, respectively.

The separate type safety injection tank 100 starts to perform safety injection of coolant into the reactor coolant system 210, as the check valve 105 installed at the safety injection pipe 107 is open when the reactor coolant system 210 is depressurized to a value lower than a preset pressure (the pressure inside the gas injection unit 102). Before a pressure difference between the gas injection unit 102 and the coolant injection unit 101 reaches a critical value, a flow rate of gas to be injected into the coolant injection unit 101 from the gas injection unit 120 increases as a differential pressure increases. Accordingly, a flow rate of coolant injected into the reactor coolant system 210 from the separate type safety injection tank 100 also increases.

As shown, the separate type safety injection tank 100 may further comprise a check valve 105 installed at the safety injection pipe 107. During a normal operation, the check valve 105 prevents coolant inside the reactor coolant system 210 from back-flowing and leaking into the separate type safety injection tank 100 in a closed state. When the reactor coolant system 210 is depressurized to a value less than the pressure inside the gas injection unit 102, the check valve 105 is open to enable safety injection of coolant from the separate type safety injection tank 100.

As shown, the separate type safety injection tank 100 may further comprise a throttle member 106 installed at the safety injection pipe 107. The throttle member 106 may be implemented as an orifice. The throttle member 106 is configured to contract the pipe line of the safety injection pipe 107 so that a flow rate of coolant injected into the reactor coolant system 210 from the separate type safety injection tank 100 can be restricted. Since a flow rate of coolant is restricted, a phenomenon that coolant is injected to the reactor coolant system 210 from the separate type safety injection tank 100 within a short time, can be prevented.

Since the separate type safety injection tank 100 serves to pressurize coolant using gas, it does not require a pressure balancing pipe for a pressure equilibrium state with the reactor coolant system 210 unlike a pressure balance type safety injection tank. This can reduce the probability to cause the occurrence of a LOCA.

Figure 8:
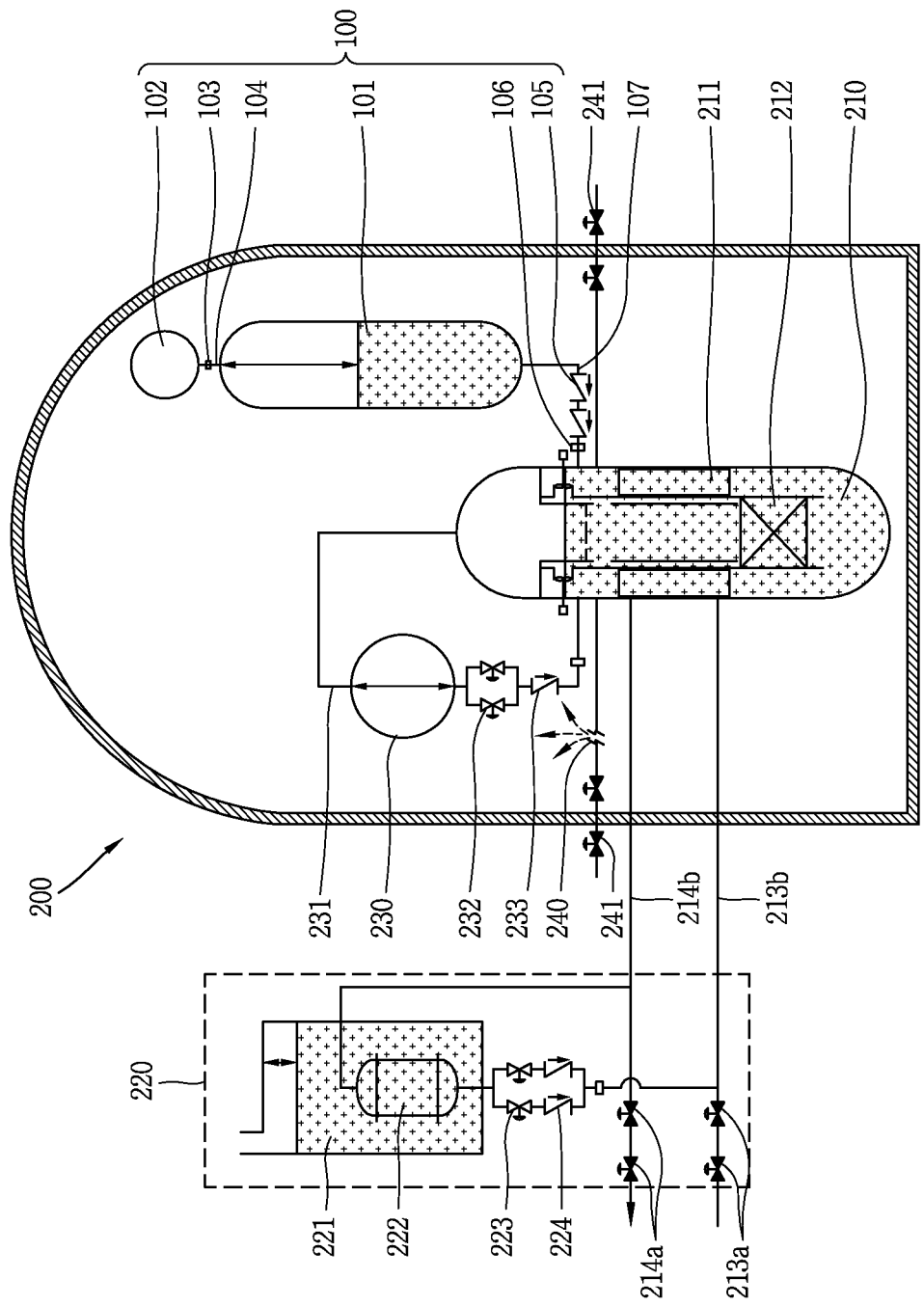
FIG. 8 is a conceptual view subsequent to FIG. 7, which shows that a core makeup tank has completed a safety injection operation while a separate type safety injection tank is performing a safety injection operation.

FIG. 8 is a conceptual view subsequent to FIG. 7, which shows that the core makeup tank 230 has completed a safety injection operation, while the separate type safety injection tank 100 continues to perform a safety injection operation as time lapses.

Referring to FIG. 8, the passive residual heat removal system 220 continuously removes heat of the core subsequent to FIG. 7, while the core makeup tank 230 has completed the operation to inject the coolant stored therein to the reactor coolant system 210.

On the other hand, as shown in FIG. 1, even if a pressure difference between the gas injection unit 102 and the coolant injection unit 101 increases to a value more than a critical pressure difference as the reactor coolant system 210 is more depressurized, a flow rate of gas injected into the coolant injection unit 101 from the gas injection unit 120 is restricted to a critical flow rate due to a critical flow of a compressive fluid passing through the orifice 103. A flow rate of coolant injected into the reactor coolant system 210 is determined by a pressure difference between the coolant injection unit 101 and the reactor coolant system 210. Therefore, the flow rate of coolant injected into the reactor coolant system 210 is also restricted, and an injection velocity is lowered to enable a continuous safety injection.

As the pressure inside the reactor coolant system 210 is stabilized, gas injection by a critical flow and coolant injection by a differential pressure can be performed for a long time. Gas is continuously discharged from the gas injection unit 102, and a pressure difference between the gas injection unit 102 and the coolant injection unit 101 is reduced.

Referring to FIGS. 4 to 8, the core makeup tank 230 is designed to have a high pressure so that coolant can be injected into the reactor coolant system within a comparatively shorter time. On the other hand, in the separate type safety injection tank 100, coolant can be gradually injected into the reactor coolant system for a desired time duration over a long period of time. In the separate type safety injection tank 100, since a flow rate of coolant is effectively utilizable to safety injection, the size of a required tank can be reduced. Further, since an initial pressure of the gas injection unit 102 can be increased, safety injection could be possible even in a case where an automatic depressurization system to depressurize the reactor coolant system 210 does not operate.

The separate type safety injection tank according to the present invention can have the following advantages.

Firstly, in the occurrence of a LOCA, coolant can be safely injected into the reactor coolant system for a desired time duration over a long period of time, using a critical flow velocity of gas. As a result, a flow rate of coolant can be effectively utilizable to safety injection, thereby significantly reducing the size of a tank to be installed.

Secondly, a comparatively constant amount of coolant can be injected into the reactor coolant system using a critical flow velocity of gas, even when pipes of various sizes are ruptured. This can allow an initial pressure of the gas injection unit to be set to be higher than a predicted pressure inside the reactor coolant system in the occurrence of a pipe rupture accident. As a result, the separate type safety injection tank can cope with various size LOCAs.

Thirdly, as additional systems for safety injection of coolant of an intermediate pressure and a low pressure are not required, equipment can be simplified and economic feasibility can be enhanced. Further, as a pressure balance pipe for forming a pressure balance is not required, the probability of the occurrence of a pipe rupture accident is lower than that in a pressure balance type safety injection tank. This can enhance the safety.

The foregoing embodiments and advantages are merely exemplary and are not to be considered as limiting the present invention. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be considered broadly within its scope as defined in the appended claims, and therefore all changes and modifications that fall within the metes and bounds of the claims, or equivalents of such metes and bounds are therefore intended to be embraced by the appended claims.

The invention claimed is:

1. A separate type safety injection system, comprising:
   a coolant injection unit connected to a reactor coolant system by a safety injection pipe such that coolant stored therein is injected into the reactor coolant system by a pressure difference when a loss-of-coolant-accident (LOCA) occurs;
   a gas injection unit disposed at a position higher than the coolant injection unit, and configured to pressurize the coolant injected into the reactor coolant system, by introducing gas stored therein to an upper part of the coolant injection unit in the loss-of-coolant-accident;
   a connection pipe configured to connect the upper part of the coolant injection unit and a lower part of the gas injection unit such that gas within the gas injection unit is introduced to the upper part of the coolant injection unit; and
   an orifice formed on an inner side of the connection pipe to contract a flow cross-sectional area of the gas introduced to the coolant injection unit, the orifice being configured to allow increases of a flow velocity and a flow rate of gas introduced to the coolant injection unit when a pressure difference between the coolant injection unit and the gas injection unit increases to a critical value and configured to passively limit the flow velocity and the flow rate of the gas introduced to the coolant injection unit as a critical flow velocity and a critical flow rate by forming choked flow when the pressure difference between the coolant injection unit and the gas injection unit is more than the critical value.

2. The separate type safety injection system of claim 1, wherein the coolant injection unit is provided with a coolant tank for storing the coolant therein,
   wherein the gas injection unit is provided with a gas tank for storing the gas therein, and
   wherein the coolant tank and the gas tank are connected to each other by the connection pipe.

3. The separate type safety injection system of claim 2, further comprising a throttle member installed at the safety injection pipe such that a flow rate of the coolant injected into the reactor coolant system is restricted, and configured to contract a flow cross-sectional area of the safety injection pipe.

4. The separate type safety injection system of claim 2, further comprising a check valve installed at the safety injection pipe such that the coolant inside the reactor coolant system is prevented from back-flowing and leaking into the separate type safety injection system.

5. The separate type safety injection system of claim 2, wherein at least part of the orifice protrudes from an inner side wall of the pipe line formed by the connection pipe or the partition wall.

6. An integral type reactor comprising:
   a core makeup tank configured to inject coolant into a reactor coolant system using a gravity force and pressure balance when an accident occurs on the reactor, by reaching a pressure equilibrium state with the reactor coolant system; and
   a separate type safety injection system connected to the reactor coolant system, and configured to inject coolant stored therein into the reactor coolant system when a loss-of-coolant-accident (LOCA) occurs,
   wherein the separate type safety injection system comprises:
   a coolant injection unit connected to a reactor coolant system by a safety injection pipe such that coolant stored therein is injected into the reactor coolant system by a pressure when the loss-of-coolant-accident occurs;
   a gas injection unit disposed at a position higher than the coolant injection unit, and configured to pressurize the coolant injected into the reactor coolant system, by introducing gas stored therein to an upper part of the coolant injection unit in the loss-of-coolant-accident;

a connection pipe configured to connect the upper part of the coolant injection unit and a lower part of the gas injection unit such that gas within the gas injection unit is introduced to the upper part of the coolant injection unit; and an orifice formed on an inner side of the connection pipe to contract a flow cross-sectional area of the gas introduced to the coolant injection unit, the orifice being configured to allow increases of a flow velocity and a flow rate of gas introduced to the coolant injection unit when a pressure difference between the coolant injection unit and the gas injection unit increases to a critical value and configured to passively limit the flow velocity and the flow rate of the gas introduced to the coolant injection unit as a critical flow velocity and a critical flow rate by forming choked flow when the pressure difference between the coolant injection unit and the gas injection unit is more than the critical value.

7. The integral type reactor of claim 6, wherein the coolant injection unit is provided with a coolant tank for storing the coolant therein, and wherein the gas injection unit is provided with a gas tank for storing the gas therein, wherein the coolant tank and the gas tank are connected to each other by the connection pipe.

8. The integral type reactor of claim 7, further comprising a throttle member installed at the safety injection pipe such that a flow rate of the coolant injected into the reactor coolant system is restricted, and configured to contract a flow cross-sectional area of the safety injection pipe.

9. The integral type reactor of claim 7, further comprising a check valve installed at the safety injection pipe such that the coolant inside the reactor coolant system is prevented from back-flowing and leaking into the separate type safety injection system.

10. The integral type reactor of claim 7, wherein at least part of the orifice protrudes from an inner side wall of the pipe line formed by the connection pipe or the partition wall.

11. The integral type reactor of claim 6, further comprising an isolation valve installed at a pipe which connects a lower end of the core makeup tank with the reactor coolant system, and configured to be open by an actuation signal generated when a related accident occurs, such that the coolant is injected into the reactor coolant system from the core makeup tank.

12. The integral type reactor of claim 6, further comprising a pressure balancing pipe having one end connected to the reactor coolant system and another end connected to the core makeup tank, such that a pressure balance is formed at the core makeup tank.

13. The integral type reactor of claim 6, further comprising a passive residual heat removal system configured to remove heat of the core by circulating a fluid stored therein to a steam generator inside the reactor coolant system, when an accident occurs on the reactor.

14. The integral type reactor of claim 13, further comprising an isolation valve installed at a pipe which connects the passive residual heat removal system with the reactor coolant system, and configured to be open by an actuation signal.

* * * * *